United States Patent [19]
Chan

[11] Patent Number: 5,317,745
[45] Date of Patent: May 31, 1994

[54] MINIMAL INTERRUPT LATENCY SCHEME USING MULTIPLE PROGRAM COUNTERS

[75] Inventor: Stephen H. Chan, Sunnyvale, Calif.

[73] Assignee: Zilog, Inc., Campbell, Calif.

[21] Appl. No.: 818,609

[22] Filed: Jan. 10, 1992

[51] Int. Cl.⁵ .............................................. G06F 9/00
[52] U.S. Cl. ..................................... 395/700; 395/775
[58] Field of Search .................. 364/DIG. 1, DIG. 2; 395/375, 700, 775, 800

[56] References Cited

U.S. PATENT DOCUMENTS 5,123,094  6/1992  MacDougall ...................... 395/375

*Primary Examiner*—Robert L. Richardson
*Attorney, Agent, or Firm*—Majestic, Parsons, Siebert & Hsue

[57] ABSTRACT

A method and apparatus for using multiple program counters to reduce the latency time of a computer in response to an interrupt or subroutine call using a memory with multiple memory locations for storing the multiple program counters and control means in order to choose which one of the memory locations is used as a current program counter. Additionally, the use of a memory location to store the starting address of the interrupt subroutine is also disclosed.

14 Claims, 6 Drawing Sheets

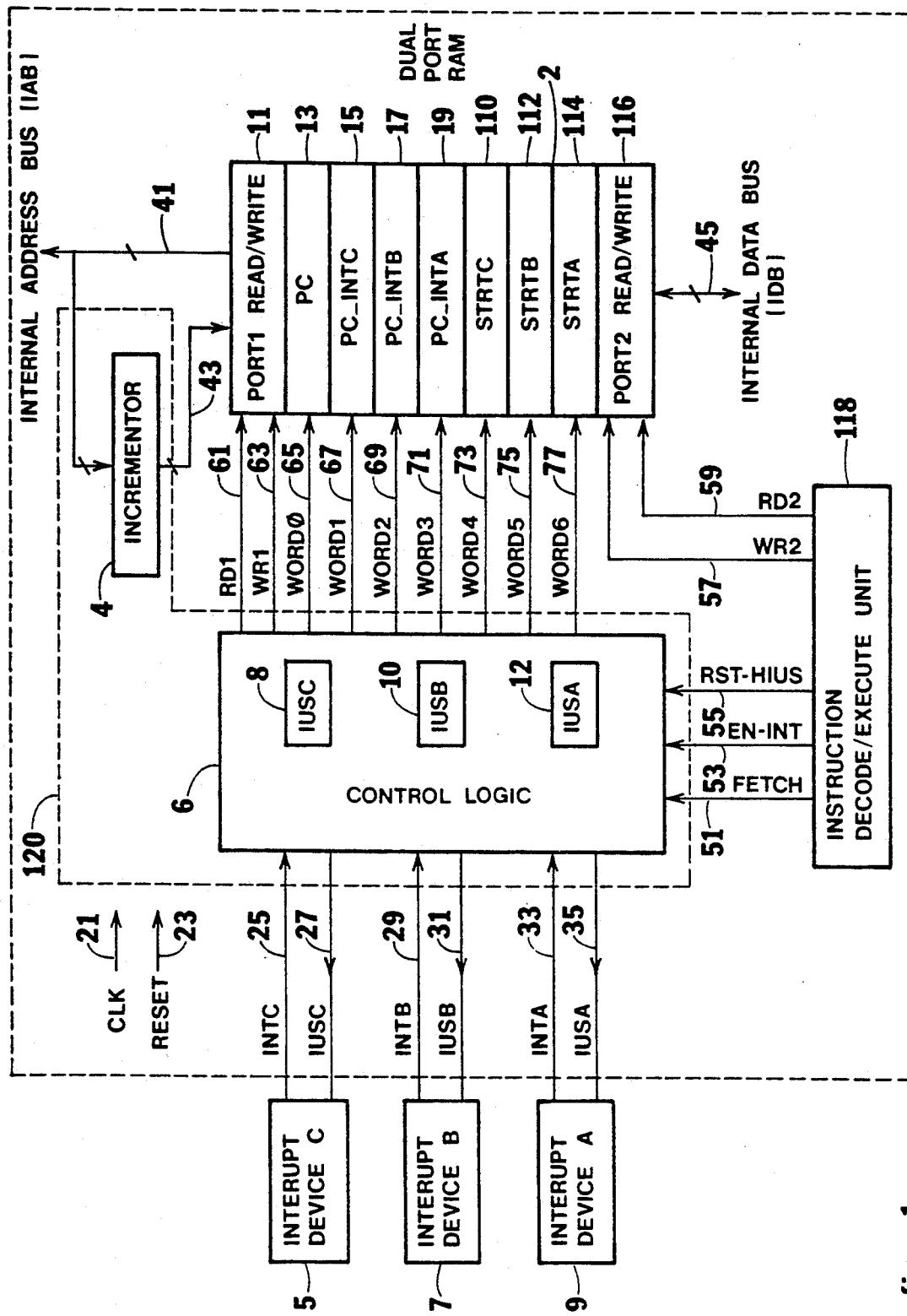
fig._1.

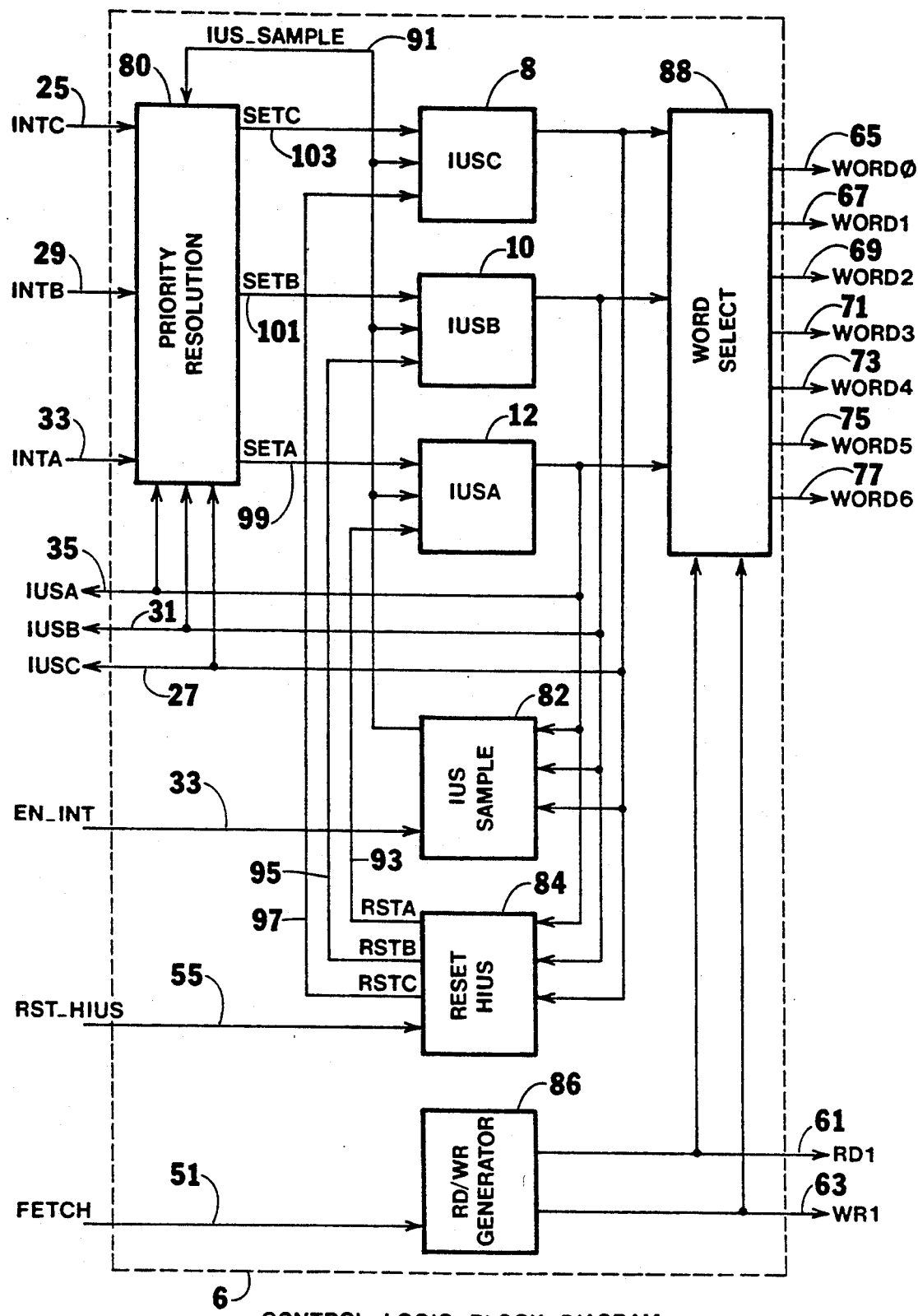
fig._2. CONTROL LOGIC BLOCK DIAGRAM

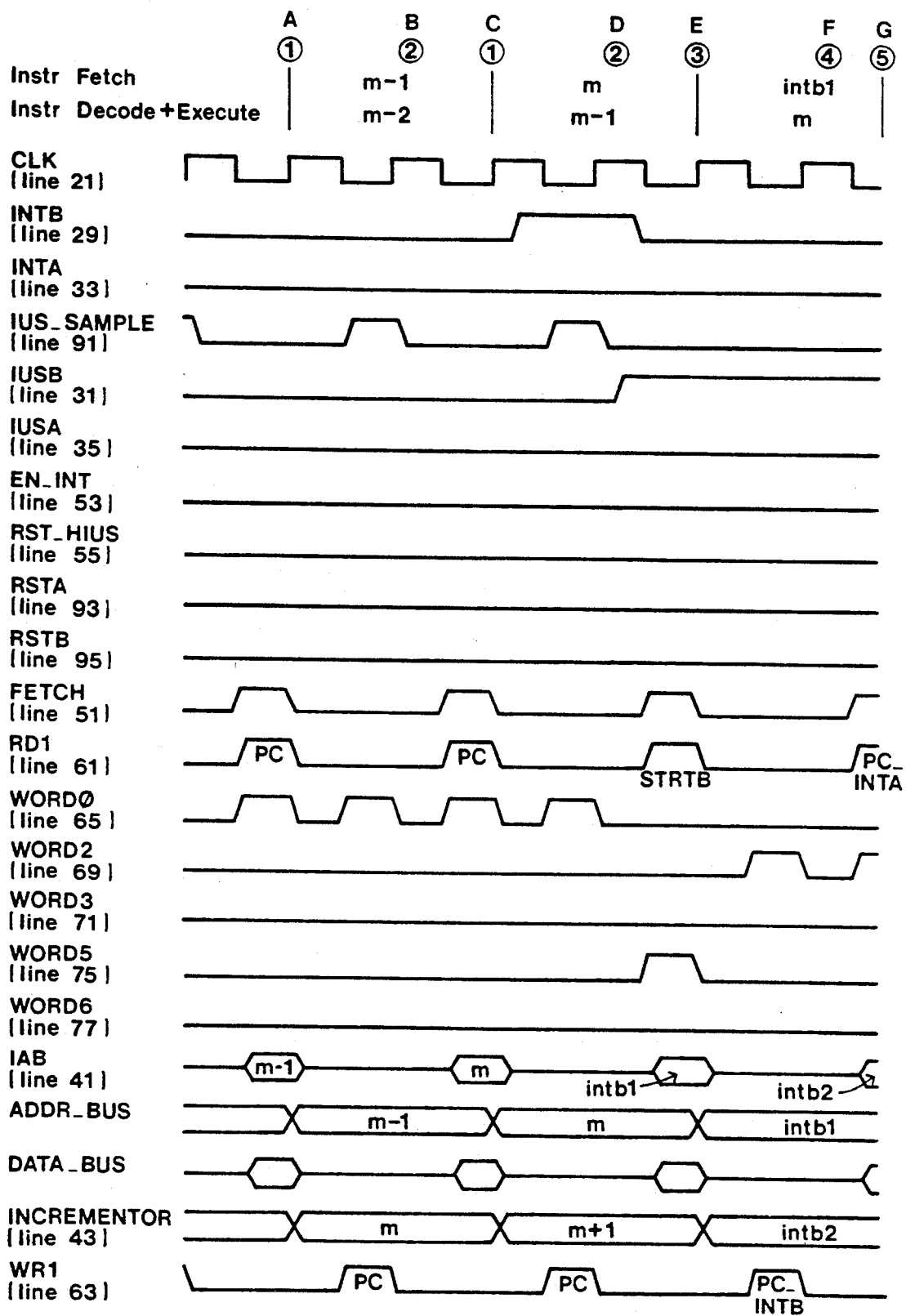
EXAMPLE EVENT SEQUENCE
fig._3A.

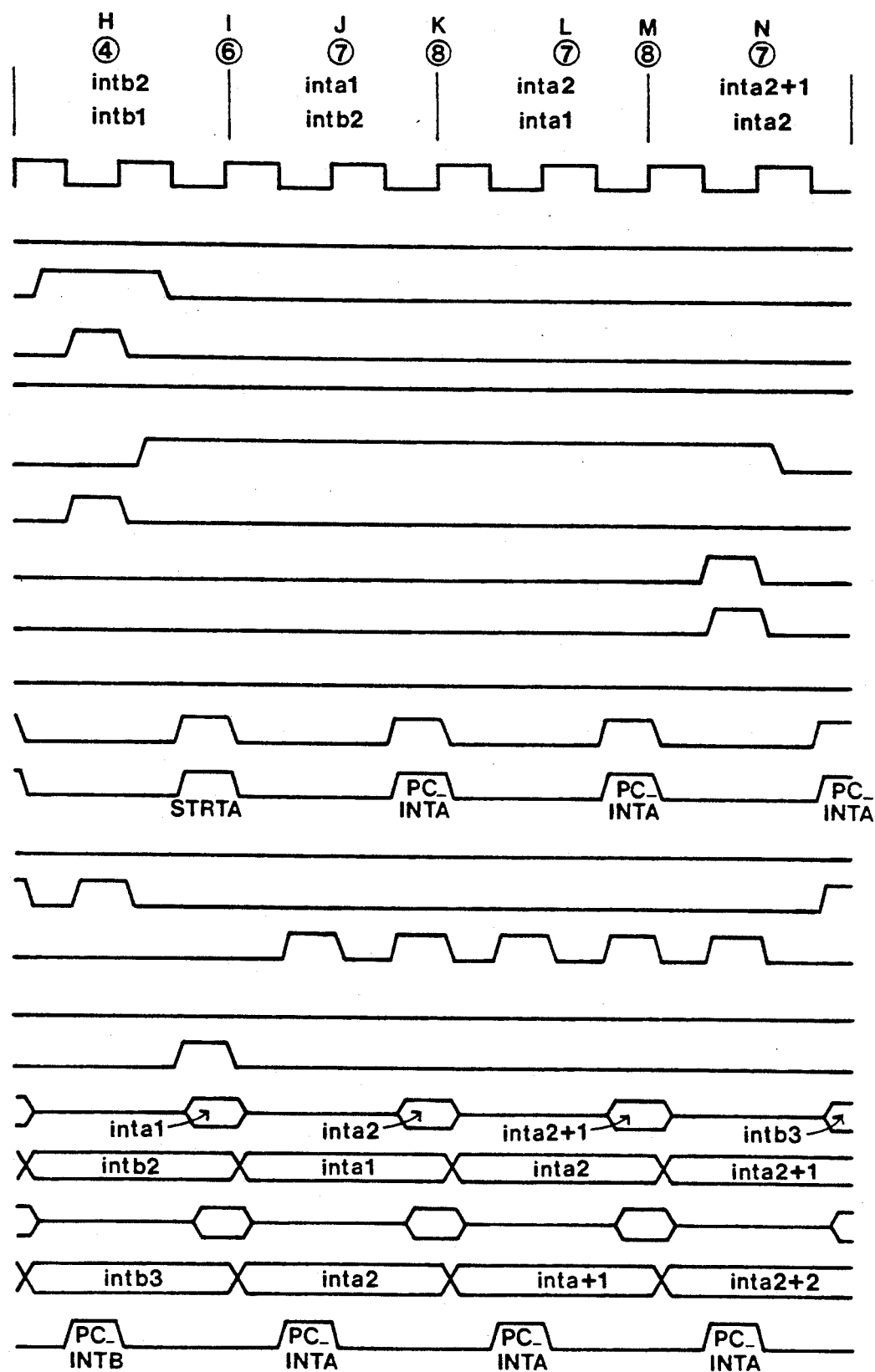
fig._3B. (place to right of fig._3A.)

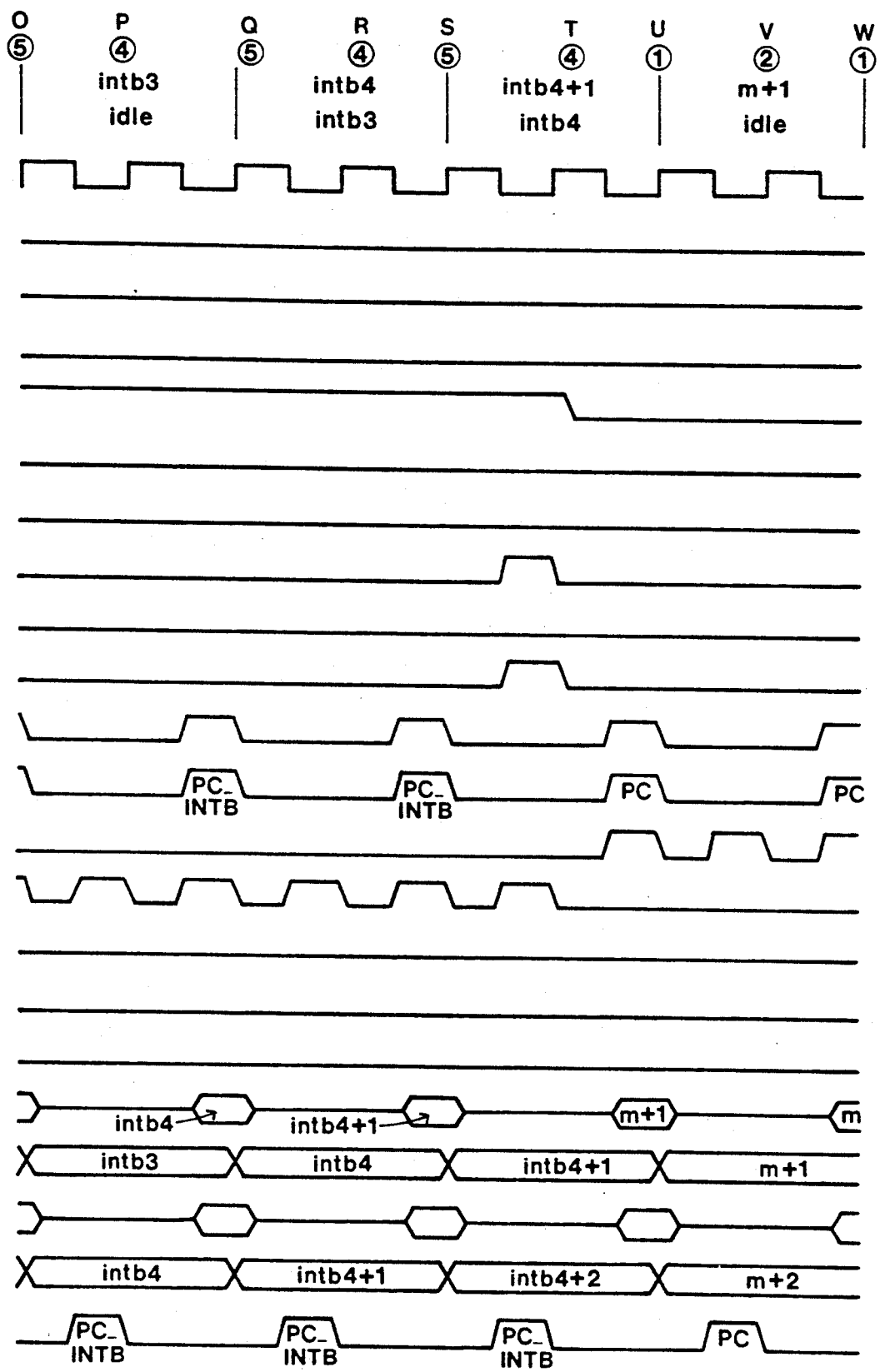
fig._3C.   (place to right of fig._3B.)

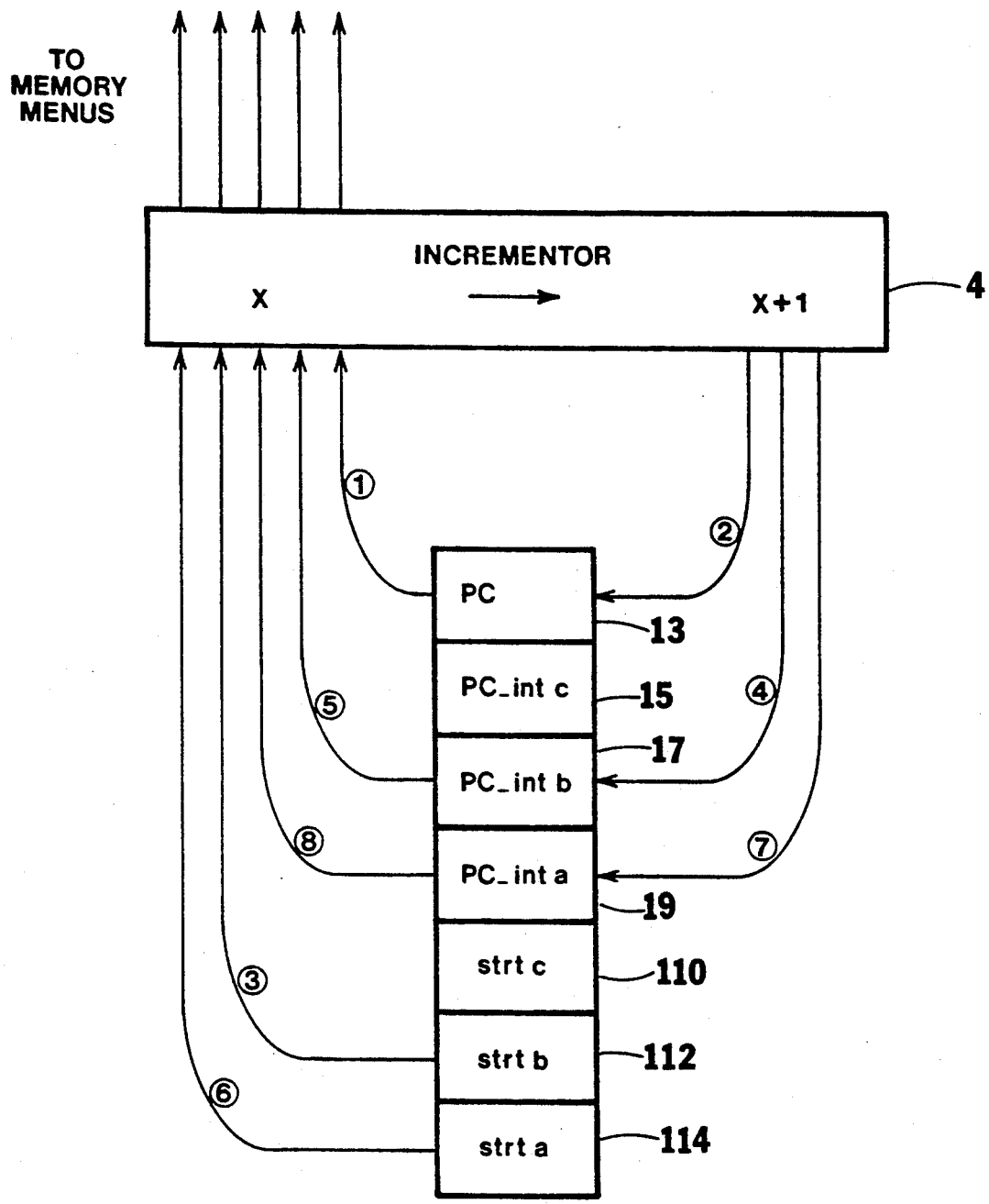
fig._4.

MINIMAL INTERRUPT LATENCY SCHEME USING MULTIPLE PROGRAM COUNTERS

Background of the Invention

This application concerns the method and apparatus for reducing the interrupt latency time.

By common design practice, a microprocessor central processing unit (cpu) samples the presence of an interrupt request close to the end of the last transaction of the instruction being executed. The cpu saves the interrupted program's next instruction address, currently residing in its program counter (pc), and then loads the starting address of the interrupt service routine into the pc. The new pc value then goes to the address bus, so that the first instruction of the service routine can be fetched for execution.

The interrupted program address is generally saved by "pushing" it into a memory stack, which is a block of memory utilized as a first-in-last-out buffer, or by storing the address in a temporary register.

The sampling of the presence of an interrupt request, the saving of the current pc value, the loading of the service routine pc value, up to the start of the first fetch transaction for the service routine, require a certain amount of time. This time, sometimes expressed as a number of cpu clock periods, is defined as the interrupt latency.

In systems where multiple interrupt request sources are present, priority resolution has to be performed so that the cpu can determine which interrupt request to service. Depending on the system architecture, this priority resolution may or may not add to the interrupt latency.

At the end of an interrupt service routine, the saved program address is reloaded into the pc, so that the interrupted program can resume its execution.

A microprocessor manufactured by Zilog, Inc., the Z80180, can be cited as a reference example. The Z80180 samples its interrupt request 0 input at the cpu clock's falling edge that is 1.5 clock periods earlier than the end of the last transaction of an instruction being executed. In interrupt mode 1, if the request input is active, the Z80180 would next perform an interrupt acknowledge transaction, followed by pushing its current pc value to memory stack, done with two memory write transactions, before the first instruction of the interrupt service routine is fetched from a fixed memory location of hexadecimal 0038. Counting from the above mentioned cpu clock's falling edge, the interrupt latency is 12.5 clock periods.

At the end of the interrupt service routine, the Z80180 reloads its saved pc value with two memory read transactions, accomplished in six clock periods. This calculation does not include the time required to fetch the "return from interrupt" instruction that invokes the pc value recovery.

Additionally, in prior computer systems on a response to a subroutine call, the pc value and other values are stored in a stack in a manner similar to the interrupt service as described above. This also creates a time delay in the computer processing.

It is an object of the present invention to have an interrupt system with a reduced latency time for responding to an interrupt.

An additional object of the present invention is to reduce the latency time of a computer in response to a subroutine call.

SUMMARY OF THE INVENTION

In accordance with the principles of the present invention, the above and other objectives are realized by utilizing a program counter apparatus for reducing the latency time of a computer in response to an interrupt or subroutine call where the apparatus has a memory with a plurality of memory locations which can correspond to program counters, where one of the plurality of memory locations corresponds to the general program counter and a number of other of the memory locations correspond to alternate program counters, and where the apparatus has control means connected to the memory for controlling which one of the memory locations is used by the computer as the current program counter.

Additionally, another aspect of the invention is directed to a method for reducing the latency time of a computer in response to interrupts from interrupt devices. This method uses a computer having a memory with memory locations, where the method has the steps of establishing a memory location in the memory corresponding to the general program counter and memory locations in the memory corresponding to alternate program counters, prioritizing the interrupts received from interrupt devices to choose an interrupt device and associated subroutine to be serviced, switching the memory location used in the computer as a program counter from the memory location corresponding to the general program counter to the memory location corresponding to the alternate program counter associated with the chosen interrupt device, executing an interrupt subroutine and then switching back to the memory location used by the computer as the program counter back from the memory location corresponding to the alternate program counter associated with the chosen interrupt device to the memory location corresponding to the general program counter.

The use of multiple program counters reduces the interrupt latency time because the old program counter value does not have to be stored into a stack and then retrieved from a stack, but the computer can merely switch from using one program counter, for example, the general program counter, to another program counter, for example, an alternate program counter associated with an interrupt device. When the subroutine of the interrupt device is finished, the computer can switch from the program counter associated with the interrupt device back to the general program counter.

BRIEF DESCRIPTION OF THE DRAWINGS

The above and other features and aspects of the present invention will become more apparent upon reading the following detailed description in conjunction with the accompanying drawings, in which:

FIG. 1 is a schematic diagram showing the control means (control logic unit and the incrementor), the multiple program counter memory, the interrupt devices, and the instruction decode execute unit;

FIG. 2 is a schematic diagram of the control logic unit;

FIG. 3A is a timing diagram for the apparatus shown in FIGS. 1 and 2;

FIG. 3B is a continuation of the timing diagram in FIG. 3A;

FIG. 3C is a continuation of the timing diagram in FIG. 3B; and

FIG. 4 is a diagram showing the steps of switching between the program counters.

DETAILED DESCRIPTION

FIG. 1 is a schematic diagram of one embodiment of the present invention. Instead of using a traditional program counter, which is a reloadable upcounter, multiple program counters are stored in a memory 2. The memory 2 has memory locations corresponding to multiple program counters, the general program counter 13, and alternate program counters 15, 17, 19. PC_INTC 15 is an alternate program counter associated with the interrupt device C 5. PC_INTB 17 is an alternate program counter corresponding to the interrupt device B 7. PC_INTA 19 is an alternate program counter corresponding to the interrupt device A 9. The apparatus of the present invention could, of course, have more alternate program counters than interrupt devices, so that the apparatus would be able to add additional interrupt devices. In addition, the present invention could be used with as many interrupt devices as the system designer desires. In one embodiment of the present invention, the memory is a dual port RAM (random access memory).

STRTC 110, STRTB 112 and STRTA 114 are memory locations in the memory 2 that correspond to the starting address of the interrupt subroutines that service the associated interrupt devices.

A control means 120 controls the use of the program counters in the memory 2. The control means 120 consists of a control logic unit 6 and an incrementor 4. The selection of the memory location in the memory 2 used as the current program counter is performed by control logic unit 6.

The control logic unit 6 also samples the interrupt signals from the interrupt devices 5, 7, and 9. Interrupt signal INTC from the interrupt device C 5 is sent to the control logic unit 6 on line 25. Interrupt signal INTB is sent to the control logic unit 6 over line 29 from interrupt device B. Interrupt signal INTA is sent to the control logic unit over line 33 by the interrupt device A. These three interrupt signals have implicit priority assignments corresponding to the priority of the interrupt devices. For example, INTA has the highest priority, INTB has the second highest priority, and INTC has the lowest priority. At close to the end of the last transaction of the instruction being executed, the control logic unit captures the logic states of these asynchronous inputs and decides which of the active interrupt signals has the highest priority assignment. It then sets one of three interrupt under service (ius) flags to reflect this resolution. Once an ius flag is set, it inhibits any lower priority interrupt signals from being recognized. The interrupt under service flags can be output from the cpu as status indicators, and if so desired, the outputs can be properly timed to align their changes to the start of the next transaction. The control logic unit 6 sends the status indicator IUSA over line 35 to interrupt device A, the status indicator IUSB over line 31 to interrupt device B, and the status indicator IUSC over line 27 to interrupt device C. The interrupt devices can be designed to recognize the active going edges of the appropriate status indicators to deassert their interrupt request signals.

In addition, interrupt nesting is allowed. By common design practice, many systems automatically disable request input sampling when entering an interrupt service subroutine. The service routine can then enable the interrupt request sampling again. The enabling of the interrupt request sampling is generally done by executing an enable interrupt instruction in the interrupt service subroutine. If an enable interrupt instruction is executed in an first interrupt service subroutine and a second interrupt request of higher priority occurs, it is possible to have more than one ius flag in the active state. This is because the corresponding active ius flag does not inhibit request inputs from higher priority interrupt devices from being sampled.

Generally, the memory location in memory 2 corresponding to the highest priority ius flag in effect is read to or written from through the port 1 11. That is, the highest priority active ius flag dictates that the corresponding alternate program counter be read to the internal address bus, and the incremented value written back into the same memory location.

If the IUSC flag is the highest priority ius flag set, then a read (RD1) from the control logic unit 6 to the port 1 11 of memory 2 over line 61 would cause the word contained in PC_INTC 15 to be sent across the internal address bus 41. In the same step, the word from PC_INTC 15 is sent to the incrementor 4. The incrementor 4 automatically stores the value sent up the internal address bus 41 and increments this value so that a write operation can use the incremented value. A write operation (WR1) over line 63 from the control logic unit 6 to the port 1 11 over line 63 while the IUSC flag is the highest priority ius flag set would cause the incremented value from the incrementor 4 to be written over bus line 43 into PC_INTC 15. PC_INTC 15, the alternate program counter associated with interrupt device C, is used as the current program counter while IUSC is the highest priority ius flag set.

If no interrupt under service flag is set, then a RD1 from the control logic unit 6 across line 61 to port 1 of the memory 2 will cause the contents of the general program counter pc 13 to be sent across the internal address bus 41 and to the incrementor 4. A WR1 signal across line 63 from the control logic unit 6 to port 1 11 of the memory 2 will cause the incremented value from the incrementor 4 to be placed into the memory location corresponding to the general program counter pc 13.

A special reset highest priority active ius flag instruction (RST_HIUS) is used as a last instruction in interrupt service routine. After this instruction is executed, the memory location of the alternate program counter corresponding to the next highest priority active ius flag would then be used as the current program counter.

An exception to the word selection rule occurs to get the first address of the interrupt subroutine. For the first iteration, when the ius flag goes active, the corresponding interrupt service routine starting address is read out of memory locations 112, 114 or 116 and the incremented value is written back to the corresponding alternate program counter memory location 15, 17 and 19. In this way, the service routine starting address is preserved for future use. For example, the first time an ius flag such as IUSC is set, the subroutine starting address memory location for the interrupt subroutine associated with the interrupt device C stored in STRTC 110 is sent up the internal address bus 41 and sent to the incrementor 4. Then, when the write signal (WR1) is sent, the incremented starting address value is sent across bus 43 back to PC_INTC 15. Since the contents of the subroutine starting address memory location for interrupt device C contained in STRTC 110 is not written upon, the subroutine starting address is saved.

Additionally, as discussed above, when none of the ius flags are active, the general program counter 13 is selected. Words 0 through 6, on lines 65, 67, 69, 71, 73, 75 and 77 send a signal to a memory location in memory 2 that controls which memory location is to be read from or written to. For example, the first time an ius flag such as IUSC 8 is set, a signal is sent across word 4 on line 73 and RD1 on line 61 to cause the contents of STRTC 110 to be read and sent across the internal address bus 41 and to the incrementor 4. A signal is sent across word 1, line 67 to PC_INTC 15 and WR1, line 63 to cause the incremented value from the incrementor 4 across the bus 43 to be written into PC_INTC 15, the memory location corresponding to the alternate program counter associated with the interrupt device C. In this manner, the word signals, the RD1 signal and the WR1 signal, the reading and writing of the memory locations in the memory 2 is controlled.

Port 2 116 of the memory 2 is connected to the internal data bus. Under program control, the interrupt service routine starting addresses, which are stored STRTC 110, STRTB 112, and STRTA 114, can be written through port 2 116. At certain instruction executions, the contents of the memory locations of the memory 2 can be modified. With properly designed system timing, the two ports 11 and 116 of memory 2 should not have access conflicts. The reading and writing through port 2 116 from the instruction decode/execute unit 118 is done with a WR2 over line 57 and a RD2 over line 59. For the balance of this discussion, it is assumed that interrupt service routines' starting addresses have been written to STRTA, STRTB, and STRTC.

A system reset on line 23 forces the general program counter pc 13 to 0 and the IUSA, IUSB and IUSC flags to inactive.

Examples of interrupt devices used in the present invention include such peripherals such as a serial communications controller (SCC), a counter/timer controller (CTC), or a parallel input/output port (PIO).

FIG. 2 is a schematic diagram of the control logic unit 6. The IUS SAMPLE block 82 in the control logic unit 6 initiates the generation of IUS_SAMPLE pulses across line 91, when an EN_INT signal is sent from the instruction decode/execute unit 118, shown in FIG. 1, across line 53. At the rising edge of an ius signal IUSC, IUSB, or IUSA, the IUS SAMPLE block stops generating IUS SAMPLE pulses across line 91. Generation of IUS_SAMPLE pulses across line 91 can resume with the execution of another enable interrupt instruction, which activates EN_INT across line 53 from the instruction decode/execute unit 118 shown in FIG. 1.

At the rising edge of the IUS_SAMPLE signal across line 91 to the priority resolution block 80, the state of the external interrupt request INTC across line 25 from interrupt device C 5 shown in FIG. 1, INTB across line 29 from interrupt device B 7 shown in FIG. 1, and INTA across line 33 from interrupt device A 9 are has the highest priority of the interrupt requests or is of a higher priority than any active ius flag, a signal is sent to the corresponding ius block, by SETC line 103, SETB line 101 or SETA line 99, to set the corresponding ius flags.

Note that if IUS_SAMPLE is not active, none of the SETC or SETB or SETA signals can go active.

A signal across the SETC line 103, SETB line 101, or SETA line 99 goes to the corresponding ius set flag blocks IUSC 8, IUSB 10, IUSA 12, and the corresponding ius flag goes active at the following edge of the IUS_SAMPLE.

When the instruction decode/execute unit 118 shown in FIG. 1 executes a reset highest priority active ius flag instruction, a RST_HIUS signal is sent across line 55. The RESET HIUS block 84 sends a reset signal RSTC across line 97, RSTB across line 95 or RSTA across line 93, to reset the corresponding ius flag in block IUSA 8, IUSB 10, or IUSC 12 on the reset signal's following edge based on which ius flag is active and has the highest priority.

Each FETCH signal across line 51 from the instruction decode/execute unit 118, shown in FIG. 1, causes the RD/WR generator 86 to generate a RD1 pulse across line 61. Each RD1 pulse across line 61 is followed by a WR1 pulse across line 63 also generated by the RD/WR generator 86. That is, one FETCH signal causes both a RD1 and a WR1 pulse.

For each RD1 or WR1 pulse, the word select block 88 causes a word pulse to be sent to a memory location. That is, word 0 over line 65, word 1 over line 67, word 2 over line 69, word 3 over line 71, word 4 over line 73, word 5 over line 75 or word 6 over line 77 is selected by the word select block 88. The word select block 88 samples the ius flags to determine which word to select. As discussed above, the general rule to determine which word is selected active is to select the program counter memory location associated with the highest priority active ius flag. For example, if IUSB is active and has the highest priority, the word select block selects word 2 and the alternate program counter associated with interrupt device B is used as the current program counter. Two exceptions are word 0 which is enabled to write and read from the general program counter memory location 13 when none of the ius flags are active, and words 4, 5, and 6 which are set at the rising edge of the ius flag to get the starting address of the corresponding interrupt service routine. Word 4, word 5 or word 6 enable the corresponding starting address location stored in STRTC 110, STRB 112 or STRA 114, containing the subroutine starting address of the interrupt device being serviced, to be output. STRTC 110, STRB 112 or STRA 114 are accessed only once at the beginning of each interrupt subroutine.

FIGS. 3A, 3B and 3C show an example of an event sequence. For example, looking at FIG. 3A, at time A, the RD1 across line 61 and the word 0 across line 65 are set so that the memory location of the general program counter 13 of the memory 2, shown in FIG. 1, is read across the internal address bus 41 and sent to the incrementor 4. The contents of the internal address bus can be used as the address of the instruction to be executed. The contents of the internal address bus across line 41 is m−1. This value is sent to the incrementor 4. It is then incremented from m−1 to m. At time B, since the word 0 line 65 and the WR1 over line 63 are both set, the incremented value from the incrementor 4, (m), is written into the memory location 13 corresponding to the general program counter.

At time C, since the RD1 and word 0 are set, the contents of the memory location 13 (m) is sent across the internal address bus and to the incrementor 4. Soon afterward, an INTB signal from the interrupt device B 7 is sent to the control logic unit 6, and since the IUS_SAMPLE signal is pulsing and no higher priority ius flag is active, the IUSB flag is set.

Next, at time E, when the RD1 flag and the word 5 flag are set, the interrupt subroutine starting address corresponding to interrupt device B which is stored in STRB 112 is sent across the internal address bus and to the incrementor 4. The incrementor 4 increments this value (intb1) to the value intb2. At time F, word 2 across line 69 and the WR1 signal across line 63 are set, so that the value intb2 is written to PC_INTB 17, the memory location corresponding to the alternate program counter associated with the interrupt device B. In this manner, the starting location of the subroutine is sent out across the internal address bus, incremented, and stored back into the alternate program counter associated with the interrupt device B.

FIG. 4 is a diagram of the steps shown in FIGS. 3A, 3B and 3C. At time A, step 1 occurs; Step 1 is a read from the general program counter 13. The contents of the general program counter is sent across the internal address bus and to the incrementor 4. At time B, Step 2 occurs, which is the writing of the incremented value to general program counter 13. At time C, step 1 is repeated. At time D, step 2 is repeated. When an interrupt occurs, the contents of the memory location corresponding to the general program counter now contains the address of the next instruction to be executed after a return from the interrupt.

Before time E, an INTB interrupt signal is sent by the interrupt device B to the control logic unit 6. The control logic unit 6 sets the IUSB flag at the down edge of the IUS-SAMPLE signal. The interrupt device B is now the chosen interrupt device.

At time E, step 3 occurs; step 3 is a read from the memory location 112 which corresponds to the starting address of the interrupt subroutine associated with the interrupt device B. This starting address is sent across the internal address bus and to the incrementor 4, which increments the value. Next, at time F, step 4 occurs; step 4 is a write of the incremented value to PC_INTB 17, the memory location corresponding to the alternate program counter associated with the interrupt device B. At time G, step 5 occurs, which is a read from the PC_INTB 17, the contents of which are sent across the internal address bus and to the incrementor 4.

Note that at time F and time G an IUS_SAMPLE signal does not occur because the subroutine for the interrupt device B has not enabled the sampling of the other interrupt devices. When the interrupt subroutine for the first chosen interrupt device (interrupt device B) enables the sampling of the other interrupt devices, the IUS_SAMPLE signal resumes at time H. A subroutine corresponding to an interrupt device need not allow the sampling of the other interrupt devices, and such a subroutine would not be interrupted by other higher priority interrupt devices.

At time H, step 4 repeats so that PC_INTB 17 now contains intb3; when the next interrupt subroutine is returned from, the alternate program counter corresponding to the interrupt device B contains the memory location of the next instruction of the interrupt subroutine for interrupt device B. During time H, the INTA signal is sampled because INT_SAMPLE is active. Since INTA is of a higher priority than IUSB, IUSA is set. Note that both IUSB and IUSA are now set. After the next write step occurs, step 4 at time H, the second chosen interrupt device may be serviced.

At time I, step 6 occurs; step 6 is a read of the starting address of the subroutine A from STRTA 114 to the internal address bus and the incrementor 4. At time J, step 7 occurs; step 7 is a write of the incremented value to the PC_INTA 19, which is the memory location corresponding to the alternate program counter associated with the interrupt device A. At time K, step 8 occurs; step 8 is a read from PC_INTA 19 across the internal address bus and to the incrementor 4.

Skipping to time 0, the interrupt subroutine A has finished, so RST_HIUS is set and IUSA is cleared. Since IUSB remains set, the interrupt subroutine for interrupt device B can resume by repeating step 5 without needing to restore any value to the alternate program counter, PC_INTB 17. At time P, step 4 repeats.

The alternate program counter corresponding to interrupt device B (PC_INTB 17) is used as the current program counter for a few more steps until time U. When the interrupt subroutine for the interrupt device B is finished, RST_HIUS is set, IUSB is reset and the general program counter is used as the current program counter.

The present invention obviates the steps of saving the current pc value and loading the new pc value when entering a service subroutine, thereby reducing interrupt latency. Saved pc value recovery at the end of a service routine is eliminated. The scheme is readily adaptable to the needs of various cpu architectures, including considerations for the instruction sets and transaction protocol timing.

Additionally, the multiple pc scheme can be used for regular subroutine calls when non-reentrant programming is used. Non-reentrant programs are programs where a subroutine does not call itself. When non-reentrant programming is used, the present scheme can reduce the latency time of switching to a called subroutine.

Various details of the implementation and the method are merely illustrative of the invention. It will be understood that various changes in such details may be within the scope of the invention, which is to be limited only by the appended claims.

What is claimed is:

1. A program counter apparatus for reducing the latency time of a computer in response to an interrupt, said apparatus comprising:
   a memory having memory locations, wherein a general program counter value is located at one of said memory locations and alternate program counter values are located at a number of other of said memory locations; and
   control means connected to said memory for controlling which one of said memory locations contains the current program counter value.

2. The apparatus in claim 1, wherein said control means includes a control logic unit and an incrementor, said incrementor connected to said memory and said control logic unit, wherein said incrementor increments the current program counter value, and wherein said control logic unit controls the incrementor.

3. (New) The apparatus of claim 2, wherein said memory includes at least one interrupt subroutine starting address memory location that stores an interrupt subroutine starting address and said control means includes means for putting the interrupt subroutine starting address from said interrupt subroutine starting address memory location to the incrementor to be incremented and then placing the incremented value into one of said alternate program counter value locations.

4. The apparatus in claim 1, wherein said control means is connected to a number of interrupt devices which are designed to send interrupt signals to the control means and wherein said control means includes means for using said interrupt signals to select which memory location contains the current program counter value.

5. A method for reducing the latency time of a computer in response to interrupts from interrupt devices, said computer including a memory with a plurality of memory locations, said method comprising the steps of:
(a) establishing a general program counter value located at a first of said memory locations in said memory, establishing alternate program counter values associated with the interrupt devices, said alternate program counter values located at other memory locations in said memory and setting the location of the current program counter value as the first memory location containing the general program counter value;
(b) prioritizing the interrupts received from the interrupt devices to choose one of the interrupt devices to be serviced by executing its associated subroutine;
(c) a switching the location of the current program counter value from the first memory location containing the general program counter value to another memory location containing the alternate program counter value associated with the chosen interrupt device;
(d) thereafter, executing the interrupt subroutine associated with the chosen interrupt device; and
(e) subsequently, switching the location of the current program counter value back from the another memory location containing the alternate program counter value associated with the chosen interrupt device to the first memory location containing the general program counter.

6. The method of claim 5, wherein step (c) includes the additional step of getting an interrupt subroutine starting address from the memory, incrementing this starting address, and placing the incremented value in the another memory location to be used as the alternate program counter value associated with the chosen interrupt device.

7. The method of claim 5, said method further comprising the following step after step (c) but before step (e):
determining whether to service a second interrupt device including prioritizing the interrupts received from interrupt devices and comparing them to the chosen interrupt device.

8. The method of claim 7, wherein the additional step of determining whether to service a second interrupt device includes the step of not allowing a service to the second interrupt device unless the interrupt subroutine associated with the chosen interrupt device enables the service of the second interrupt device and the second interrupt device has a greater priority than the chosen interrupt device.

9. The method of claim 7, further comprising the following steps in order after the determining step:
switching the location of the current program counter value from the another memory location containing the alternate program counter value associated with the chosen interrupt device to yet another memory location containing a second alternate program counter value associated with the chosen second interrupt device;
executing the interrupt subroutine associated with the chosen second interrupt device;
switching the location of the current program counter value back from the yet another memory location containing the second alternate program counter value associated with the chosen second interrupt device to the another memory location containing the alternate program counter value associated with the chosen interrupt device.

10. A program counter apparatus for reducing the latency time of a computer in response to a subroutine call, said apparatus comprising:
a memory having memory locations, wherein a general program counter value is located at one of said memory locations and alternate program counter values are located at a number of other of said memory locations; and
control means connected to said memory for controlling which one of said memory locations contains the current program counter value.

11. The apparatus in claim 10, wherein said control means includes means for selecting one of said alternate program counter values to be used as the current program counter value in response to a subroutine call from an Instruction Decode/Execute unit and means for selecting the general program counter value to be used as the current program counter value when said Instruction Decode/Execute unit finishes executing the subroutine.

12. The apparatus in claim 10, wherein said control means includes a control logic unit and an incrementor, said incrementor connected to said memory and said control logic unit, wherein said incrementor increments the current program counter value, and wherein said control logic unit controls the incrementor.

13. The apparatus of claim 12, wherein said memory includes at least one subroutine starting address memory location that stores a subroutine starting address and said control means includes means for putting the subroutine starting address from said subroutine starting address memory location to the incrementor to be incremented and then placing the incremented value into one of said alternate program counter value locations.

14. The apparatus of claim 13, wherein said memory includes a first port connected to said control means and a second port connected to an Instruction Decode/Execute unit.

* * * * *

UNITED STATES PATENT AND TRADEMARK OFFICE
CERTIFICATE OF CORRECTION

PATENT NO. : 5,317,745
DATED : May 31, 1994
INVENTOR(S) : Stephen H. Chan

It is certified that error appears in the above-indentified patent and that said Letters Patent is hereby corrected as shown below:

In Column 8, line 62:
   replace "(New) The apparatus of claim 2, wherein said" with:

--The apparatus of claim 2, wherein said--

In Column 9, line 27:
   replace "(c) a switching the location of the current program" with:

--(c) switching the location of the current program--

Signed and Sealed this

Twenty-fifth Day of October, 1994

Attest:

BRUCE LEHMAN

Attesting Officer

Commissioner of Patents and Trademarks